United States Patent [19]

Slominski et al.

[11] E Patent Number: Re. 31,694

[45] Reissued Date of Patent: Oct. 2, 1984

[54] APPARATUS AND METHOD FOR AUTOMATICALLY MAINTAINING AN ELECTROLESS COPPER PLATING BATH

[75] Inventors: Leo J. Slominski, Bristol; Thomas A. Rau, Watertown, both of Conn.

[73] Assignee: MacDermid Incorporated, Waterbury, Conn.

[21] Appl. No.: 127,220

[22] Filed: Mar. 4, 1980

Related U.S. Patent Documents

Reissue of:

[64] Patent No.: 4,096,301
Issued: Jun. 20, 1978
Appl. No.: 659,475
Filed: Feb. 19, 1976

[51] Int. Cl.[3] ..... B05D 1/40; B05D 3/12

[52] U.S. Cl. ..... 427/8; 118/690; 118/694; 422/110; 427/9; 427/437; 427/443.1

[58] Field of Search ..... 427/443.1, 437, 9, 8; 23/230 A; 118/690, 694; 422/110; 106/1.26, 1.27

[56] References Cited

U.S. PATENT DOCUMENTS

| | | | |
|---|---|---|---|
| 2,872,353 | 2/1959 | Metheny | 427/437 |
| 3,033,703 | 5/1962 | Schneble et al. | 427/437 |
| 3,326,700 | 6/1967 | Zeblisky | 427/443.1 |
| 3,532,519 | 10/1970 | Hirohaha et al. | 427/443.1 |
| 3,934,054 | 1/1976 | Schmeling | 427/345 |
| 3,951,602 | 4/1976 | Thompson | 106/1.27 |
| 3,959,531 | 5/1976 | Schneble et al. | 427/345 |

OTHER PUBLICATIONS

Hermann, Metalloberfläche, Angewandte Elektrochemie 26 (1972) No. 9, pp. 334–337.

*Primary Examiner*—Sadie L. Childs
*Attorney, Agent, or Firm*—St. Onge, Steward, Johnston & Reens

[57] ABSTRACT

Apparatus and a method are disclosed for replenishing an electroless plating bath with those of its components which are consumed during plating operation, in order that the concentration of components be maintained as nearly constant as possible in the working bath. The system involves withdrawing from the bath a small sample stream at fixed rate, and subjecting this automatically to a sequence of analyses. The system is particularly adapted to control of electroless copper solutions comprising copper ion, hydroxide and formaldehyde as the consumable components. Sequential analyses are made of the sample stream for these components using instrumentation to control actuators which introduce replenisher solutions into the plating tank in response to signals generated by the instruments whenever deviation occurs from a pre-set level. Standardized test solutions of known concentration and rate of feed are introduced into the test stream to optomize test conditions during the analyses. Changes in bath composition occurring during normal plating operations thus provide changes in instrument readings which are analogs of the concentration of the respective components and signals produced by such readings serve to activate the respective replenisher solution feed controls.

16 Claims, 2 Drawing Figures

APPARATUS AND METHOD FOR AUTOMATICALLY MAINTAINING AN ELECTROLESS COPPER PLATING BATH

Matter enclosed in heavy brackets [ ] appears in the original patent but forms no part of this reissue specification; matter printed in italics indicates the additions made by reissue.

FIELD OF THE INVENTION

This invention relates to controlling automatically the composition of an electroless copper plating bath, and to apparatus for accomplishing such control, whereby to maintain the bath composition as nearly constant as possible during plating operations.

BACKGROUND OF THE INVENTION

The conventional method of maintaining electroless copper plating solutions in commercial or industrial plants making printed circuit boards and similar workpieces has commonly been by more-or-less frequent manual analysis of the plating bath solution while the plating operation is underway, and then manually making corrective batch additions of components on the basis of the analysis data to replace those consumed. A disadvantage of such system is that by the time the analysis is performed and the replenishment addition requirements are calculated, the plating solution, assuming it has been operating continuously, will have undergone further compositional depletion so that the component levels calculated may be as much as 10% to 20% inaccurate at the time the additions are actually made to the bath.

If the workload in the plating bath is reasonably constant or can be calculated, it is possible to program the additions so that they can be periodically made with some degree of success. However, it is still necessary to verify the concentrations by analysis at least several times during the working day.

In order to eliminate the time lag of manual analysis, and the uncertainty of programmed periodic or batch additions, attempts have been made to automate the analysis and control of the additions on a continuous basis. It is known, of course, that the principle reaction occurring in a plating bath during plating operation is the one represented by the following equation:

$$Cu^{++}+2HCHO+4OH^{-}\rightarrow Cu^{\circ}+H_2+2H_2O+2HCOO^{-} \quad (I)$$

As will be seen by this equation, the three consumable ingredients, copper, formaldehyde and alkali metal hydroxide, react in a definite stoichiometric ratio and must be replenished in the same ratio to maintain the composition constant. It would appear that, because of this stoichiometric relationship, monitoring any one of these ingredients would provide the necessary information for controlling the replenishment of all three.

In practice, however, there are side reactions which take place independently of the main reaction described above. The most serious of these side reactions is the well-known Canizzaro reaction where formaldehyde and hydroxide interact:

$$2HCHO+OH^{-}\rightarrow CH_3OH+2HCOO^{-} \quad (II)$$

It thus becomes apparent that, in addition to copper, either formaldehyde or hydroxide must also be monitored. By monitoring either of these, the other un-monitored component can be calculated and additions programmed in the required ratio to the addition of the monitored component.

Thus a two-component monitoring control can be established using copper and either hydroxide or formaldehyde, to serve as a basis for programming a control system. U.S. Pat. No. 3,532,519 discloses such a method by monitoring copper and hydroxide. In the method disclosed, a sample stream from the plating bath is pumped through a colorimeter for copper determination, and through a pH meter for a determination of the pH of the bath. The patented system provides that, when a preselected set-point is indicated by either the colorimeter or pH indicator, a relay activates an appropriate pump to introduce aqueous alkali hydroxide solution and/or mixed formaldehyde and copper salt solution, until the sample readings taken from the bath again return to normal or pre-set condition. This method is also summarized in "GALVANOTECHNIK," 61(3), 215(1970) by W. Immel.

These prior methods have been found less than satisfactory with modern highly-active electroless copper solutions, the reasons being that the copper in such solutions will undergo autocatalytic deposition after relatively short periods of operation of the system, producing deposition on the colorimeter cell walls as well as on the pH electrodes, causing inaccurate readings and unreliable functioning of both control systems. Also, the pH of the operating bath is not a reliable indicator of the hydroxide concentration under the conditions employed, since modern plating solutions operate at a pH of 12.5 or higher where the reading is no longer linear with hydroxide concentration due to buffering and sodium ion interference.

SUMMARY OF THE INVENTION

The principal object of the present invention is to provide improved means for continuously and automatically controlling the concentration of an electroless copper plating bath in respect to the major components consumed during a normal plating operation, such components being the copper, formaldehyde and hydroxide constituents.

Commensurate with this general objective, it is a further purpose of the invention to eliminate the lagtime inherent in operations relying upon manual analysis and batch replacement additions to the operating bath; also to elimination of human error in attempting to rapidly calculate and make such additions manually. It follows also that it is a purpose of the invention to reduce or eliminate attention to the bath required of operating personnel, with significant labor savings achieved thereby.

From the standpoint of plating function, the invention is directed to improving the accuracy and uniformity of bath maintenance so that large, periodic, variation in concentration of components in the bath is avoided. This has direct effect on the work quality; that is, the quality of a printed circuit board or other workpiece being plated, since better predictability of the plating rate and resulting thickness of deposit in a given time is made possible by the invention.

Briefly, the invention contemplates a method and apparatus which involves withdrawing a sample stream from the working bath, and running this through three separate analysis stations. As an essential part of the analysis procedure, a test acid solution of known, standardized normality is introduced at constant feed rate and is mixed into the sample stream to produce an optimum pH level, as more fully described below, as a datum level for a first analysis. Any change occurring in the pH from that level provides a signal of hydroxide concentration changes actually occurring in the plating bath, and such change will be an analog of the hydroxide content of the working bath. A control is thus provided for signalling replenishment of hydroxide to the bath to maintain the desired working level of that component. The foregoing acidification (or at least partial neutralization) of the sample stream is also taken advantage of in the analysis procedure, in that this serves to reduce the sensitivity of the sample solution to autocatalytic degredation. That is, the tendency for metal in solution to deposit on the sensing members of the analyzing instruments is largely prevented so that, for example, the impairment of light transmittance in a colorimeter cell used for analyzing copper content of the sample, due to build-up of copper on the cell wall, is substantially avoided. Accurate colorimeter readings are thus obtained for controlling replenishment of the copper in the plating bath. Finally, the analysis system utilizes a second pH analysis of the acidified sample stream following addition of a test sulfite solution of known strength and rate of introduction. The sulfite reacts with formaldehyde to produce hydroxide ions, thus raising the pH of the sample. This reading is made continuously and any change from a preset level is utilized to signal addition to the plating bath of formaldehyde.

Thus the level in the working bath of the three major consumable components is continuously monitored and maintained, free of interference problems previously encountered as the result of copper deposition on the sensing elements of the monitoring instruments.

The invention is illustrated by the following description of a detailed example, but it will be apparent that various modifications may be made, based on the teaching contained herein. Accordingly it will be understood that the invention is not limited by the specific details hereinafter described, except as may be required by the appended claims.

BRIEF DESCRIPTION OF THE DRAWINGS

The invention is set forth in detail in the following description with reference to the accompanying drawings, wherein.

DETAILED DESCRIPTION OF THE INVENTION

Figure 1:
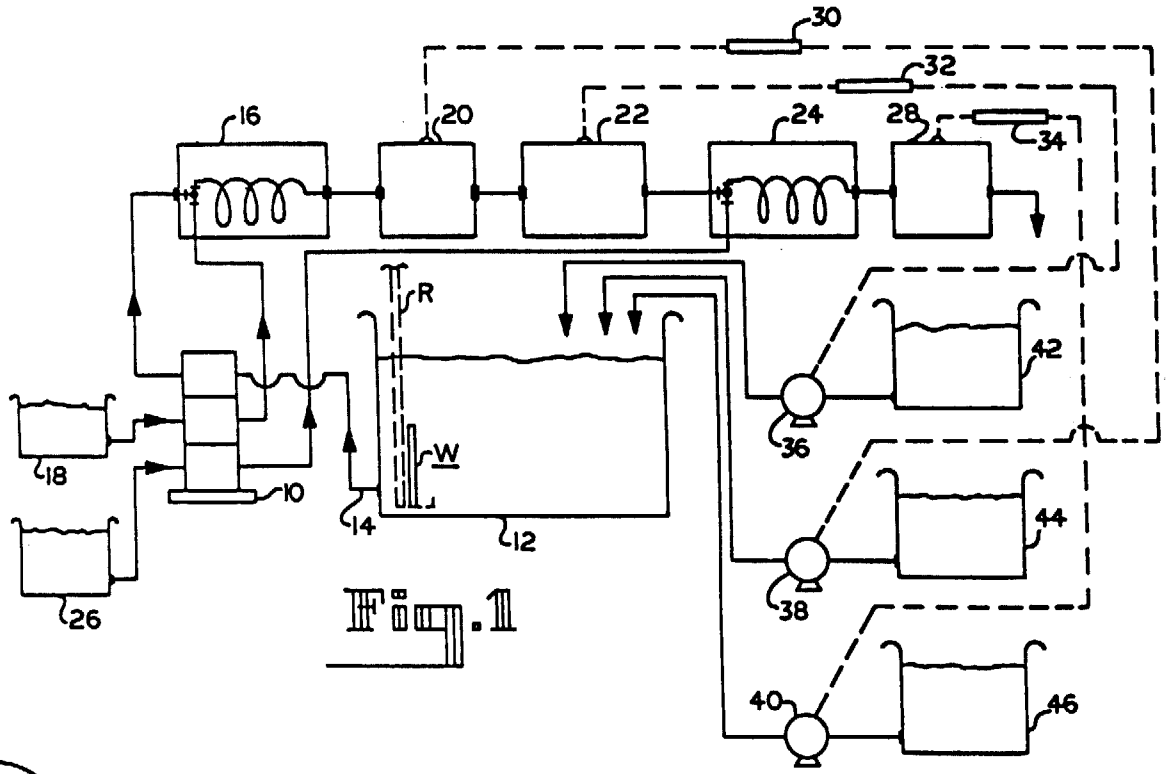
FIG. 1 is a schematic flow diagram of an installation utilizing the invention herein.

The inaccuracy problems experienced with prior automated electroless copper control systems attempting to read directly the pH at the high working level in the bath lead the inventors here to conclude that this was one of the first problems to be dealt with. Their proposal, accordingly, was to reduce the pH of the sampled portion of the plating bath to a level where more accurate determination can be made, and this is accomplished by adding a standardized test acid solution at constant rate to the sample stream. By establishing a pH reading of the acidified sample stream which represents optimum hydroxide concentration in the plating bath, any change subsequently occurring in that pH reading on the sample provides an indication of changes occurring in the plating bath itself. In this case, changes in the pH reading provide an analog of the hydroxide content of the bath. Using the pH indication to actuate a suitable controller, alkali metal hydroxide replenisher solution is added to the plating bath automatically whenever the pH indication falls below a pre-set reference datum level.

It was further recognized by the inventors that acidifying the sample stream would serve also to reduce the activity of the solution as a plating bath. This sample acidification, therefore, also provided a cure to the problem of autocatalytic deposition of metal from the sample stream onto the sensing elements of the control instruments, and especially the colorimeter cell used for copper concentration analysis. Accordingly a cell transmittance reading on the acidified sample stream, representative of optimum copper concentration in the plating bath itself, can be employed as a reference datum against which to compare when changes of copper level occur in the plating bath. By electronically coupling the colorimeter readout through appropriate amplifier means to a controller, this also can be caused to add make-up or replenisher copper salt solution to the plating tank whenever the colorimeter reading falls below the aforesaid reference datum condition.

Finally, it was also recognized that because of the previously mentioned Canizzaro side-reaction occuring in the plating tank, the formaldehyde concentration would have to be separately monitored and that this could be readily accomplished by, in effect, back-titrating the previously acidified sample stream by introduction of a standardized sulfite solution at known rate. Reaction between the sulfite and the formaldehyde occurs in accordance with the following equation:

$$HCHO + Na_2SO_3 + H_2O \rightarrow NaOH + CH_2(NaSO_3)OH \quad \text{(III)}$$

From this it is apparent that the increase in alkalinity produced in the sample stream by this reaction will be an analog of the original formaldehyde concentration. Therefore once again, by using suitable pH metering means to determine a reference datum for optimum conditions in the plating bath, a signal can be developed for any deviation from the reference datum to control addition of formaldehyde to the bath and maintain it accurately at optimum condition of formaldehyde content.

Here, therefore, is a complete solution to the problems of analyzing the consumable components reliably in a plating bath. Since the pH of the original sample is initially lowered by introducing the test acid, the sample no longer functions as an effective plating solution and does not foul up the electrodes of the pH meters or the colorimeter cell. These instruments can then be reliably utilized to signal for additions of the components to be made to the plating bath whenever deviation from a predetermined norm is indicated by any one of them.

Referring to the diagram in FIG. 1 of an electroless copper bath control, a multiple channel metering pump 10 is employed whereby the flow rates of the sample stream and standardized acid and sulfite test solutions can be appropriately set. As will be seen, the plating bath is contained in tank 12 in which workpieces W are supported on suitable racks R and maintained in or advanced through the tank to build up the desired deposit of copper on the workpiece.

A small sample stream of the operating bath is continuously withdrawn from tank 12 through connection by duct 14 to one channel of pump 10, and the sample is fed to a suitable mixing device 16 where it is combined with a standardized test acid solution. This latter is fed to the mixing device by a second channel of pump 10 from a source of such standardized acid solution in container 18. The combined sample and acid streams are thoroughly mixed in device 16 and the resulting acidified (i.e., partially neutralized) sample stream is then fed through a first pH metering station 20 where the reading is displayed and/or recorded on a chart recorder.

The acidified stream is then conducted through the transmittance cell of a standard colorimeter 22 and is next fed to a second mixing device 24. At this point it is further combined with a stream of standardized sodium sulfite solution pumped from a container 26 through a third channel of metering pump 10 to be combined in device 24 with the sample stream as described. Thereafter, the stream is further conducted through a second pH meter where the reading is displayed and/or recorded, after which the sample stream is discharged.

Each of the test stations comprising pH meters 20, 28 and colorimeter 22 is equipped with a conventional controller which, upon reaching a pre-selected setpoint, activates a respective pump or other replenishment means. In the specific illustration of FIG. 1, controller 30 is activated by pH meter 20, controller 32 is activated by colorimeter 22 and controller 34 is activated by pH meter 28. These controllers, in turn, are connected to operate respective pumps 36, 38 and 40 which serve to introduce replenisher solutions into the plating bath. Pump 36 is connected through suitable ducting to a supply tank 42 containing copper replenisher; pump 38 is similarly connected to tank 44 containing hydroxide replenisher; and pump 40 is connected to tank 46 containing formaldehyde replenisher.

The method of operating the system is described in connection with the following example.

An electroless copper plating solution is formulated with the following composition:

Copper sulfate: 0.04M
Copper complexer: 0.05M
Formaldehyde: 0.08M
Sodium Hydroxide: 0.10M
Sulphur stabilizer: 1.0ppm This is representative of commercial electroless copper solutions in general use. "Metex 9042" sold commercially by MacDermid Incorporated is one example of this type of solution.

Figure 2:
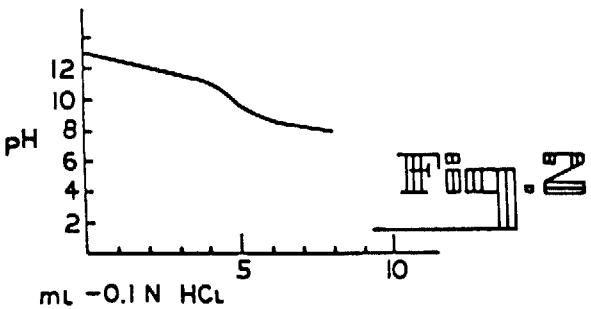
FIG. 2 is a plot of pH against acid addition to a typical electroless plating solution sample.

In order to select a suitable reference datum for the desired control or set-point which determines when the replenisher solutions are to be added to the plating tank, a sample, for example 25 ml of the foregoing bath solution, is first titrated potentiometrically using 0.1N hydrochloric acid, and a plot of the titration is made. The results of this are represented in FIG. 2. The inflection of the plot which occurs at pH 10.5 indicates the end-point of the titration; i.e. the sodium hydroxide content of the bath solution. The plateau in the curve following the end-point represents the neutralization curve for the complexer. Since the complexer is not used up in the plating reaction, its value will be constant and will not affect the readings. Thus changes which do appear in the reading of the pH meters 20, 28 will accordingly be directly indicative of changes in sodium hydroxide concentration in the operating bath.

In selecting the operating point or condition of the analysis system in respect to the initial acidification of the sample stream, it is preferred not to operate on the steep slope of the titration curve of the FIG. 2 where color change will occur. On the other hand, a set-point too high on the curve will result, later on in the test procedure when the sulfite solution is added, in a pH condition of the sample stream which is so high (above 12) as to initiate sensitivity loss in the determination. In practice, a useful set-point for the initial acidification has been found to be desirably from about 8.5 to 9.5 as read by meter 20, but values from about 7.0 to 10.5 will be satisfactory.

The system obviously enables a wide selection of sample as well as test solution stream flow rates to be made, as well as wide selection of concentrations in the test solutions. For the type of electroless copper bath indicated above, it has been empirically determined that a flow rate of around 500 ml/hr. of the copper bath sample stream, around 100 ml/hr. of hydrochloric acid; and around 200 ml/hr. of sodium sulfite solution, provides satisfactory operation with available multichannel metering pumps.

From these flow rates and the titration curve (FIG. 2), the required concentration of hydrochloric acid can be calculated for initial acidification to achieve the desired pH 8.5 to 9.5 level. However, it is generally found that the flow rates of low volume multichannel metering pumps are head-sensitive, being dependent upon placement of the test solution reservoirs relative to the pump. As a result, some adjustment in acid concentration from that calculated by titration will generally appear, and in the example here given, the acid concentration of the test hydrochloric acid solution was found empirically to be 1.1N to provide a datum or reference reading of pH 9.2 of meter 20 when the system had reached an equillibrium state. As will be apparent from the further disclosure, the absolute value of the reference datum is not critical so long as it represents a suitable operating condition for testing purposes in accordance with the limitations described above relative to the plot of FIG. 2.

Similarly, the sulfite test solution concentration is unimportant, so long of course as it is in excess of that of the formaldehyde in order that the reaction represented by equation III above will be truly representative. In the specific example here described, the concentration of the sulfite solution selected was 1.0M, and additionally the solution was adjusted to pH 7.0 with sulfuric acid. The pH datum level for the sample stream at this point is preferably between about 8.0 and 12.0, with an optimum of from about 9.5 to 11.0.

With the apparatus set up as in FIG. 1 and starting with a freshly prepared electroless copper plating solution and prior to the introduction of any work pieces into the bath, the system is allowed to reach equilibrium, which is generally attained within a few minutes. At such time, with pH meter 20 for the hydroxide module indicating pH 9.2 as already mentioned, the control dial of controller 20 is turned down until an indicator light shows that the controller relay is closed and replenisher pump 38 is operating. The controller is then backed off to the point where the pilot light just extinguishes and the controller relay opens to discontinue pump operation. This pre-sets the monitoring and bath replenishment reference condition or datum of this part of the system so that thereafter, whenever the pH at meter 20 drops below 9.2, the pump relay is closed to add hydroxide replenisher solution from reservoir 44.

In practice, a replenisher solution consisting of 8.0M sodium hydroxide is found to be suitable.

The copper concentration control in the plating bath is monitored, as described, by colorimeter 22 which, in the example given above, gives an absorbence reading of 0.7 under the specified conditions at the starting, stabilized condition of the system. Again, the control dial of controller 32 is adjusted to the point where the indicator light is just extinguished and the pump 36 is inoperative. A copper replenisher solution comprising 0.8M copper sulfate and 1.6M formaldehyde, gives very satisfactory results.

Finally, the formaldehyde control module comprising the second pH meter 28, controller 34, pump 40 and formaldehyde replenisher solution reservoir 46, is adjusted as described above to establish a reference condition or datum. Under the conditions described in this example, the actual pH reading at meter 28 will be 10.4 which therefore avoids the difficulty mentioned above of trying to operate at too high a pH reading, as would occur after back-titrating with the sulfite solution if too high a reference datum level upstream at meter 20 is selected. A dilute solution of the formaldehyde replenisher solution is satisfactory, since this is employed primarily to make up for loss due to the Canazzaro reaction described by equation (III).

It will be apparent from the understanding given above of the operation of the system that, since the formaldehyde control is pH dependent, it is necessary that the sodium hydroxide concentration in the plating bath be correct before formaldehyde replenisher pump 40 is activated. This is readily accomplished in a practical system by routing the formaldehyde control signal through a pair of normally closed contacts carried by the control relay of controller 30. Thus, when hydroxide replenisher pump 38 is operating (relay of controller 30 is closed), formaldehyde pump 40 is locked out and cannot function until hydroxide controller 30 is satisfied and its relay falls back into normal position, deactivating pump 38 but closing the normally-closed (lock-out) contacts through which power to pump 40 is routed.

Since the copper replenisher solution is made up to contain formaldehyde in approximately stoiciometric balance, as suggested in the specific example just described, the formaldehyde concentration in the bath is normally maintained close to optimum by the copper module (colorimeter 22, controller 32) and the formaldehyde pump 40 is cycled infrequently. It serves mainly to compensate for side-reaction losses in the system described.

While the relative positions of the hydroxide and formaldehyde modules in the control system must be in the order shown for the reasons already described, the placement of the copper control module in the system is unimportant so long as it is not placed ahead of the point of acidification of the sample stream. In regard to selection of the test acid, hydrochloric represents the material of choice but obviously any other acid which does not interfere with the analysis procedure, for example sulfuric, phosphoric, nitric, acetic, etc., can also be employed. Also, the sulfite selected for back-titration of formaldehyde content may be any soluble sulfite or bisulfite.

What is claimed is:

1. Apparatus for maintaining the consumable components of an electroless copper plating solution at predetermined concentration in a plating tank containing said plating solution while workpieces are being processed in the tank, said plating solution being an aqueous solution of copper ion, an aqueous metal hydroxide, a complexing agent for maintaining the copper ions in solution, and formaldehyde or formaldehyde derivatives as a reducing agent for the copper, said copper ion, hydroxide and formaldehyde being the said consumable components of said solution, said apparatus comprising in combination:

means withdrawing a sample stream of plating solution at a pre-determined constant rate from the plating tank and passing it through a sequence of analyzing stations to a point of discharge;

a source of acid of standardized normality and means introducing this acid into said sample stream at a predetermined constant rate ahead of the sequence of test stations;

a first pH analyzing station having means for measuring the pH of the acidified sample stream, and controller means actuated by said first pH measuring means;

a source of aqueous alkali metal hydroxide replenisher solution, and means actuated by said first pH controller means for feeding said hydroxide replenisher solution to the plating tank whenever said first pH measuring means indicates a reading below a selected level;

a source of aqueous sulfite solution of standardized molar concentration, and means for mixing said sulfite solution into said acidified sample stream, at a constant predetermined rate, *only* downstream of said first pH analyzing station;

a second pH analyzing station having means for measuring the pH of the sample stream downstream of the point of introduction of the sulfite solution, and controller means actuated by said second pH measuring means;

a source of aqueous formaldehyde replenisher solution, and means actuated by said second pH controller for feeding said formaldehyde replenisher solution to the plating tank whenever said second pH measuring means indicates a reading below a selected level;

means analyzing the copper ion concentration of the acidified sample stream, and controller means operatively connected to and actuated by said copper analyzing means;

and a source of aqueous copper ion replenisher solution, and means actuated by said copper analyzing controller means for feeding copper replenisher solution to the plating tank whenever said copper analyzing means indicates a reading below a selected level.

2. Apparatus as defined in claim 1, wherein the acid introduced into the sample stream ahead of the sequence of analyzing station is hydrochloric or sulfuric.

3. Apparatus as defined in claim 2, wherein the acid solution has a standardized normality and the feed rate is such that the resulting pH of the acidified sample stream is from about 7.0 to 10.5.

4. Apparatus as defined in claim 1, wherein the sulfite solution is sodium sulfite or bisulfite.

5. Apparatus as defined in claim 4, wherein the sulfite solution has a standardized molarity and the rate at which it is fed into the sample stream is such that the resulting pH of the sample stream is from about 8.0 to 12.0.

6. A method for automatically maintaining consumable components of an *aqueous* electroless [metal]

*copper* plating solution at predetermined concentration in a plating tank while workpieces are being processed in the tank, wherein said solution *comprises copper ions, alkali metal hydroxide, and formaldehyde or formaldehyde derivative as the consumable components thereof, and said solution* is required to be highly alkaline to be effective for plating purposes, the steps which comprise:

withdrawing a sample stream of the plating solution from the tank at a predetermined constant rate and passing this stream through a sequence of analyzing stations to a point of discharge;

introducing an acid of standardized normality into the sample stream at predetermined constant feed rate to reduce the alkalinity of the sample stream to a level where it is no longer effective for producing electroless deposition of [the metal] *copper* therein;

*measuring at a first station the pH of the acidified sample stream to determine the alkali metal hydroxide concentration prior to analysis of the sample stream for other consumable components of the plating solution;* and then subjecting the acidified stream to analysis of [the] *said other* consumable components of the plating solution.

7. The method as defined in claim 6, [wherein said plating solution is an aqueous electroless copper plating solution comprising copper ions, alkali metal hydroxide and formaldehyde or formaldehyde derivative as the consumable components thereof,] wherein said acid *is* introduced into the sample stream [is hydrochloric at a standardized normality and] at a feed rate such that the resulting pH of the acidified stream is from about 7.0 to 10.5.

8. The method as defined in claim 7, [wherein the subsequent analyses of the sample stream comprise:] *and further comprising:*

[subjecting the acidified sample stream to analysis at a first pH station, and] automatically feeding an aqueous hydroxide replenisher solution from a source thereof into the plating tank whenever [the analysis reading] *said pH measurement at said first station* is below a predetermined level;

[introducing into the acidified sample downstream of said first pH analysis an aqueous sulfite solution of a standarized molarity at a constant feed rate, and subjecting the sample stream downstream of the addition of the sulfite to analysis at a second pH station,] *mixing an aqueous sulfite solution of standardized molarity into said acidified sample stream at a predetermined constant rate, downstream of said first pH analyzing station, measuring the pH of said sample stream downstream of the point of introduction of said sulfite solution,* and automatically feeding an aqueous formaldehyde replenisher solution from a source thereof into the plating tank whenever said second pH reading is below a predetermined level; and subjecting said sample stream, at some point subsequent to acidification thereof, to analyzing means for determination of the copper concentration, and automatically feeding an aqueous copper ion replenisher solution into the plating tank whenever the copper analysis reading is below a predetermined level.

9. The method as defined in claim 8, wherein the sulfite solution is at a standardized molarity and is fed at such rate that the resulting pH at the second pH station is from about 8.0 to 12.0.

10. The method as defined in claim 8, wherein the feeding of aqueous formaldehyde replenisher is prevented whenever the pH at said first station is below the predetermined level, regardless of the pH at said second station.

*11. The method as defined in claim 7 wherein said acid introduced into the sample stream is hydrochloric acid.*

*12. Apparatus for analyzing for consumable components of an electroless copper plating solution in a plating tank containing said plating solution while workpieces are being processed in the tank, said plating solution being an aqueous solution comprising as the consumable components thereof copper ion, alkali metal hydroxide, and formaldehyde or formaldehyde derivatives, said apparatus comprising in combination:*

*means for withdrawing a sample stream of plating solution at a predetermined constant rate from the plating tank and passing it through a sequence of analyzing stations;*

*means for introducing an acid of standardized normality into said sample stream at a predetermined constant rate ahead of the sequence of analyzing stations;*

*a first pH analyzing station having means for measuring the pH of the acidified sample stream whereby to determine the hydroxide concentration in the plating solution;*

*means for mixing an aqueous sulfite solution of standardized molarity into said acidified sample stream, at a constant predetermined rate, only downstream of said first pH analyzing station,*

*and a second pH analyzing station having means for measuring the resulting pH of the sample stream downstream of the point of introduction of the sulfite solution to determine the formaldehyde concentration in the sample stream and*

*means for analyzing the copper ion concentration of the acidified sample stream.*

*13. Apparatus as defined in claim 12, wherein the acid introduced into the sample stream ahead of the sequence of analyzing station is hydrochloric or sulfuric.*

*14. Apparatus as defined in claim 13, wherein the acid solution feed rate is such that the resulting pH of the acidified sample stream is from about 7.0 to 10.5.*

*15. Apparatus as defined in claim 12, wherein the sulfite solution is sodium sulfite or bisulfite.*

*16. Apparatus as defined in claim 15, wherein the the rate at which said sulfite solution is fed into the sample stream is such that the resulting pH of the sample stream is from about 8.0 to 12.0.*

* * * * *